(12) United States Patent
Davilla

(10) Patent No.: US 8,139,866 B2
(45) Date of Patent: Mar. 20, 2012

(54) METHOD AND SYSTEM FOR DRIFT CORRECTION OF SPECTRUM IMAGES

(75) Inventor: Scott Davilla, Hillsborough, NC (US)

(73) Assignee: 4pi Analysis, Inc., Hillborough, NC (US)

( * ) Notice: Subject to any disclaimer, the term of this patent is extended or adjusted under 35 U.S.C. 154(b) by 950 days.

(21) Appl. No.: 12/107,850

(22) Filed: Apr. 23, 2008

(65) Prior Publication Data

US 2008/0260106 A1  Oct. 23, 2008

Related U.S. Application Data

(60) Provisional application No. 60/925,825, filed on Apr. 23, 2007.

(51) Int. Cl.
*G06K 9/48* (2006.01)
(52) U.S. Cl. ......... 382/197; 382/131; 382/151; 382/284
(58) Field of Classification Search .................. 382/197, 382/198, 206, 229, 291, 292, 294; 378/5, 378/57, 204, 207
See application file for complete search history.

(56) References Cited

U.S. PATENT DOCUMENTS

| | | | |
|---|---|---|---|
| 5,951,475 A * | 9/1999 | Gueziec et al. | 600/425 |
| 6,148,118 A * | 11/2000 | Murakami et al. | 382/284 |
| 6,222,637 B1 * | 4/2001 | Ito et al. | 358/1.18 |
| 6,264,365 B1 * | 7/2001 | Patch | 378/204 |
| 6,525,836 B1 * | 2/2003 | Ito et al. | 358/1.18 |
| 7,366,282 B2 * | 4/2008 | Peschmann | 378/57 |
| 2001/0017939 A1 * | 8/2001 | Yoshida | 382/151 |
| 2002/0006217 A1 * | 1/2002 | Rubbert et al. | 382/131 |
| 2004/0264628 A1 * | 12/2004 | Besson | 378/5 |
| 2006/0006322 A1 * | 1/2006 | Vaidya | 250/252.1 |
| 2006/0082798 A1 * | 4/2006 | Holub | 358/1.9 |
| 2007/0041508 A1 * | 2/2007 | Tubbs | 378/207 |
| 2009/0097726 A1 * | 4/2009 | Rusko et al. | 382/131 |
| 2009/0297006 A1 * | 12/2009 | Suri et al. | 382/131 |

* cited by examiner

*Primary Examiner* — Wesley Tucker
*Assistant Examiner* — Aklilu Woldemariam
(74) *Attorney, Agent, or Firm* — Ward and Smith, P.A.

(57) ABSTRACT

A method and system corrects for drift in spectrum images resulting from collection signals. Signals resulting from a scan are collected. A reference image is obtained for determining initial pixel locations. A correction image is extracted, validated and correction vectors generated.

20 Claims, 4 Drawing Sheets

ILLUSTRATION OF THE SCANNING SYSTEM ON IMAGING DEVICE

ILLUSTRATION OF THE SCANNING SYSTEM ON IMAGING DEVICE

Uncorrected Frame Summation

METHOD AND SYSTEM FOR DRIFT CORRECTION OF SPECTRUM IMAGES

CROSS-REFERENCE TO RELATED APPLICATIONS

This application is related to and claims priority to Provisional Application Ser. No. 60/925,825 filed Apr. 23, 2007, and entitled "Method and System for Drift Correction of Spectrum Images." The disclosure of said Provisional Application Ser. No. 60/925,825 is expressly incorporated by reference herein.

BACKGROUND OF THE INVENTION

1. Field of Invention

This invention relates to a method and system for the drift correction of spectrum images. More particularly, this invention describes a method and system for drift correction of spectrum images using concurrent collection signals, for example, both electron and x-ray signals, while eliminating periodic correction-image collection and correction steps.

2. Discussion of Prior Art

Spectrum Imaging is the collection and spatial registration of all spectral events, yielding a spectral data cube. Spectral Events are the converted x-ray energies from an x-ray detector/pulse processor, the value of which is proportional to the energy of the x-ray. Various analytical methods can be applied to the spectral data cube, ranging from simple elemental region-of-interest images, to spectral summation of the pixel elemental weight percent, to true chemical phase images. By the term "region-of-interest images" is meant a region defined with regard to a span of x-ray energies that corresponds to peak location of an element in an x-ray spectrum. The sum of x-ray counts over the defined energy region is collected for each pixel, creating an element image. By the term "spectral summation of the pixel elemental weight percent" is meant the summation of the x-ray spectra that correspond to pixels inside a spatially defined region of interest. This resultant x-ray spectrum can then be quantified to yield the weight percent values of the constituent elemental distribution. By the term "true chemical phase images" is meant the processing of the spectral data cube by methods such as principal components or multi-variant statistical analysis, both of which use statistical methods to transform the data into a basis where it can be visualized according to an eigenvector formulation.

Collecting a spectrum image involves scan generation which is the process of generating an x-y spatial raster scan using a scanned excitation source (electron, ion or photon beam) or a stationary excitation source and scanning specimen stage. Typically scan generation is used to collect an image from any signal, where the source of the signal is converted to analog or digital from either a backscattered or secondary electron detector, but it can be a signal from any detector connected to a microscope (e.g., absorbed current, EBIC, or cathodoluminescence detectors). With traditional spectrum imaging, the signal source is only the converted x-ray energies.

The time required to collect a spectrum image is dependent on the x-ray photon flux, the amount of x-ray dwell time per pixel, the image size and the number of image frames scanned. With typical x-ray detector/pulse processors configured for adequate energy resolution, this time is on the order of 15 minutes to several hours. During this time, the specimen can drift due to stage movement or instrument electronics. This drift is detrimental to the collection of a spectrum image as it results in a spatial smearing of features.

There are two methods in the prior art known for drift correction. Both methods entail stopping the collection of the spectrum image to collect a drift correction-image using an electron imaging source (secondary or backscattered).

In the first method (Lamvik, M. K, 1989), the spectrum image is collected sequentially (Ingram et al., 1988, Hunt and Williams, 1991), that is, pixel by pixel. At every n pixels, a correction-image is collected and saved. After the entire spectrum image is collected and saved, the correction-images are compared to a reference-image and drift correction vectors computed. These correction vectors are then applied to the saved spectrum image and the x, y pixels are re-packed to new locations. This procedure is known as passive drift correction and is not widely in use due to the disadvantage of requiring long collection times per pixel in collecting the sequential spectrum image.

In the second method, the spectrum image is collected using the method of position-tagged spectrometry (Legge and Hammond, 1979, Mott et al., 1995) in which the x-rays are tagged with the position of origin while the pixels are continually scanned. At every n frames, a correction-image is collected and compared to a reference-image and drift correction vectors computed. The drift correction vectors are used to adjust the next x, y scan position. This method is known as active drift correction, and must be applied during collection. It has the disadvantage of requiring that the collected image area be a sub-region of the available field of view. This sub-region is allowed to move around as the procedure tracks drift. The application of drift correction vectors is typically preformed using additional analog offset circuits or electron gun tilt adjustments and as such must be calibrated for proper operation. The largest disadvantage is that the drift correction vectors are applied after drift has been detected. This means that, between drift correction-images, x-ray events can be inserted in incorrect x, y pixel locations. Depending on the drift rate, the spectrum image can still have spatial smearing of features despite the use of an active drift correction procedure.

BRIEF SUMMARY OF THE INVENTION

In accordance with the invention, there is provided a method and system of drift correction of spectrum images which uses a system of concurrent collection of both electron and x-ray events (Davilla, 2006, Event-Streamed Spectrum Imaging, the disclosure of which is specifically incorporated by reference herein).

In one aspect there is provided a method of correcting for drift in spectrum images resulting from collection signals. Signals resulting from a scan with an excitation source which are registered to x, y pixel positions on a sample are collected. A reference image is extracted from a plurality of frames of collected signals. Pixel events corresponding to the frame of the reference image are inserted into initial pixel locations. Indexing forward to a next frame of collected signals is conducted and a first correction image is extracted using the same signal source as the reference image. A validation check of the first correction image is conducted to determine if the first correction image is correct. If the validation checking fails, the checking is repeated until a non-corrupt correction image is located. Once a valid correction image is located, correction vectors are generated for correcting the acquired image.

The excitation sources may be an electron source, an x-ray source, an ion source, a photon source or an optical source. The signals may be a collected from scanning the excitation source or from scanning the sample with a stationary excitation source. Preferably all signals are collected concurrently for each frame prior to processing. Validation is preferably conducted by qualifying the spatial integrity of the image. Yet still further, if validation fails, skipping the frame of the first correction image to the next frame until a non-corrupt image is located occurs. Once a valid correction image is located, the correction image is realigned to the reference image.

In a system aspect, a scan generator drives scan coils that move an excitation source (electron, ion or photon beam) relative to sample. Detectors collect signals registered to x, y pixel positions of the beam on the sample. The system includes processors, and related components and memory programmed to process the signals as previously described.

As may be appreciated from the foregoing discussion concurrent collection treats all signal sources as events, allowing the collection of spectral events to be concurrent with the collection of electron events. The events are structured into packets of information that greatly simplifies transfer, storage and subsequent processing for display or analysis. The structuring of events also provides a temporal component that allows processing elements to "look ahead" in the event stream in order to make decisions on how to process up coming events. This "look ahead" capability allows the drift correction vectors to be pre-computed before the x-ray events are inserted into x, y pixel locations, resulting in exact registration. As every frame contains electron image information, the collection process is continuous without the need to stop and collect drift correction-images. In addition, since all event information is saved, drift correction can be applied during or after the spectrum image is collected. Advanced image processing can even detect and skip corrupted frames where the image has been distorted due to electron beam fluctuation or mechanical vibration.

DETAILED DESCRIPTION OF THE INVENTION

Figure 1:
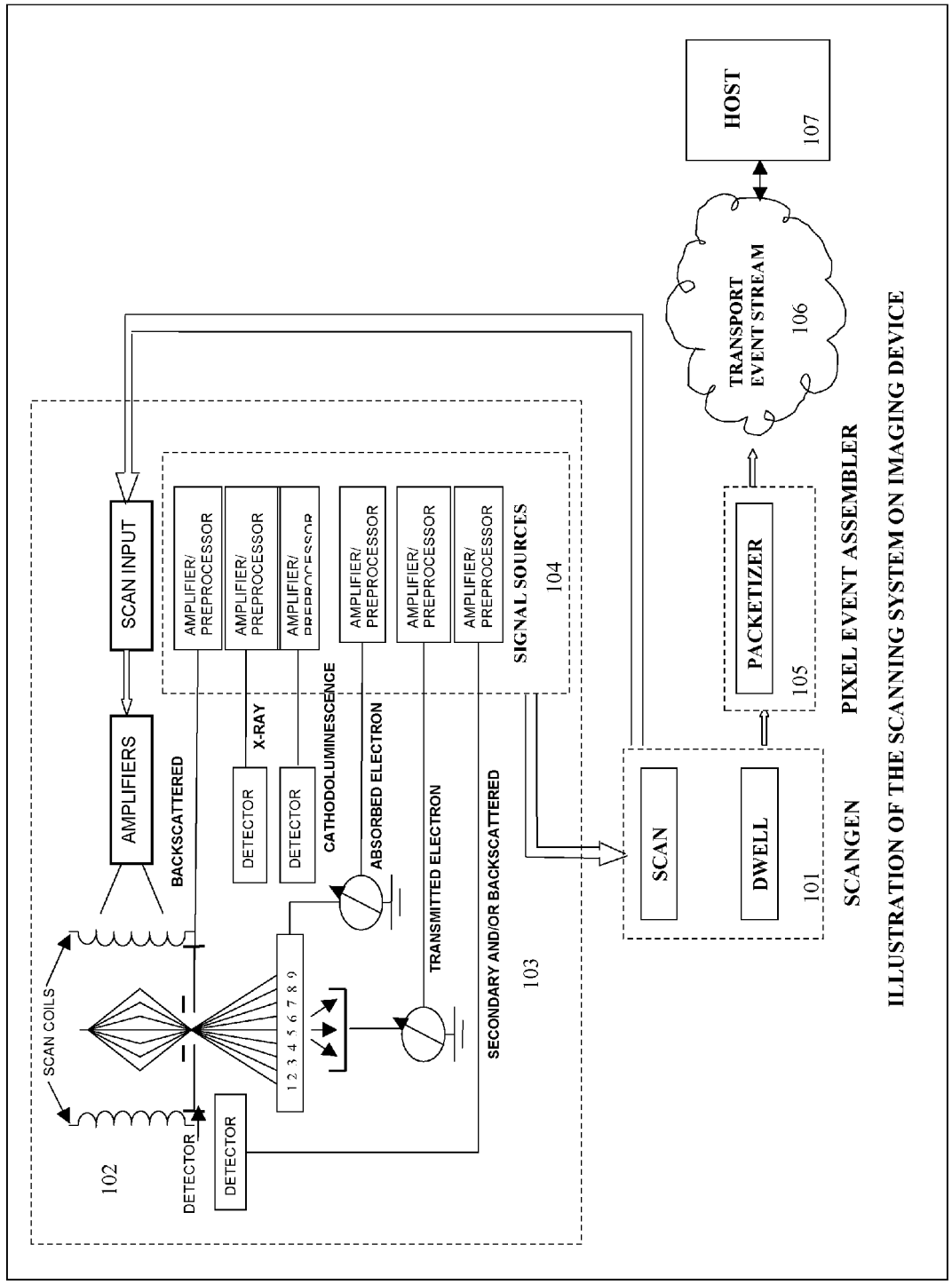
FIG. 1 is a high level block diagram of a conventional scan generator 101 used for the concurrent collection of signals 104 from electron and x-ray sources 103.

This invention of drift correction of spectrum images uses a system of concurrent collection of signals from electron and x-ray sources and the treatment of these signals as pixel events. FIG. 1 is a high level block diagram of such a system. A scan generator 101 generates an x, y raster which is used drive scan coils 102 that moves excitation source (electron, ion or photon) over a sample. Such a sample can be, for example, a integrated circuit wafer for the purpose of manufacturing defect analysis. Various electron, photon and x-ray detectors 103 collect signals which are registered to the x, y pixel positions of the beam on the sample. The scan generator 101 acquires data concurrently from all signal sources 104 for every pixel position over the area of interest creating pixel events. A pixel event contains all information related to a pixel position. Each x, y raster over the sample constitutes one frame of pixel events. Pixel events are formatted into packets 105 and streamed 106 directly or over any network interface to a host 107, where the event stream is buffered and stored for use in display and processing. The concurrent collection of all signals and streaming of the formatted pixel events provides a temporal component that allows processing elements to "look ahead" in the event stream in order to make decisions on how to process up coming events. This temporal component of the event stream enables the method of drift correction of spectrum images.

Figure 2:
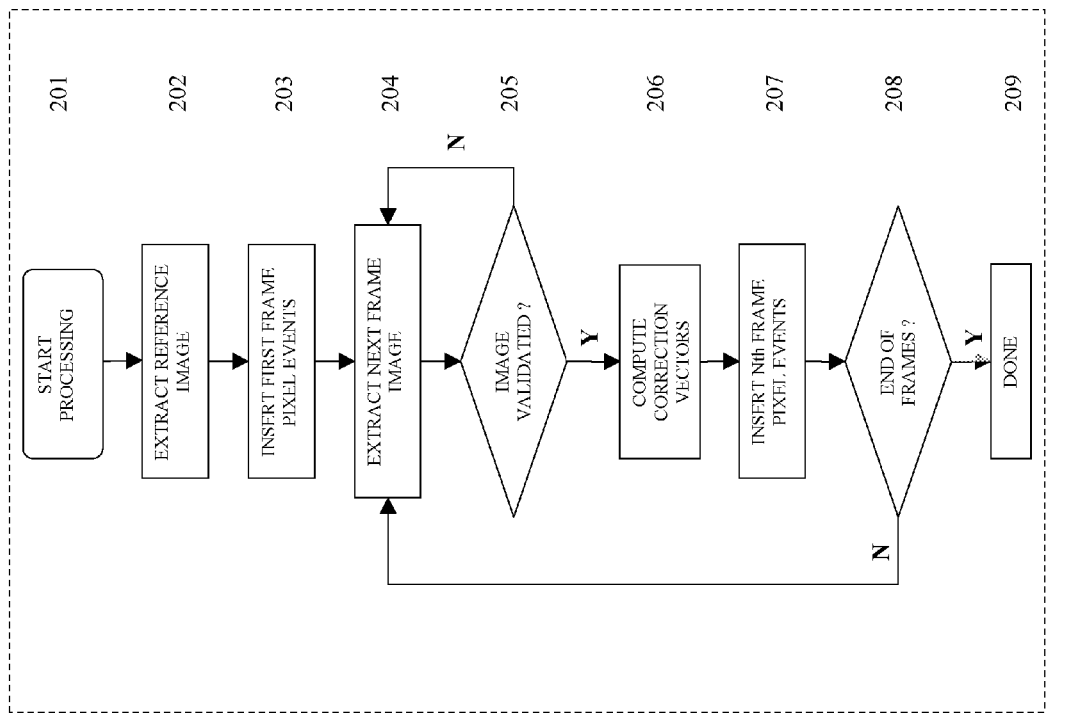
FIG. 2 is a flow chart illustrating the steps performed by the method of drift correction of spectrum images according to a preferred embodiment of the invention.

FIG. 2 is a flow chart illustrating the steps performed by the method of drift correction of spectrum images. The method starts 201 by reading an event stream that has originated from a system described in FIG. 1. The event stream can be live, buffered, or from a saved file.

A reference-image is extracted 202 from the first frame using a suitable signal source. The "reference-image" can be any image that provides a reference image to which another image is compared, not necessarily always the first image in a series of frames. A "suitable signal source" can be any electron (secondary, backscattered, etc) or other signal source that has sufficient spatial features for the purpose of establishing an image reference point or points.

The pixel events corresponding to the frame of the reference-image are then inserted into initial pixel locations 203. The insertion process is signal dependent and can be simple as with electron sources where the pixel value of the resultant image is the measured value corresponding to the signal source or complicated as with x-ray sources where the pixel value is the sum of the x-ray events over a region of interest.

The method then scans ahead in the event stream to the next frame of events and a correction-image from is extracted 204 using the same signal source as the reference-image.

This correction-image can be checked through an optional validation 205 step. A "validation check" can be any method that qualifies the spatial integrity of an image. Frames that contain corrupted images might be skipped so as to reduce smearing of features. If validation fails, this frame of events is skipped and the method scans ahead to the next frame 204. This process is repeated until a non-corrupt correction-image is located. By "non-corrupt correction-image" is meant an image free of artifacts such as mechanical vibration, electrical instability and ion/electron beam intensity fluctuations.

Once a valid correction image is located, the pixel correction vectors are computed 206 that will re-align the correction-image of this frame to the reference-image. The "computation" of correction vectors can be any method applied in the spatial or frequency domain that yields a vector or series of vectors that can be used to transform one image to align spatially with another image. Specific examples of such methods include, but are not limited to, numeric cross-correlation of images in spatial or frequency domain, numeric cross-correlation of filtered or differentiated variants of the images in spatial or frequency domain, and spatially-warping grid correlation.

The correction vectors are used to correct the pixel locations of the frame of pixel events corresponding to this correction-image. The pixel events from this frame are then extracted are inserted into the corrected pixel locations 207.

If the event stream contains more frames 208, the method sequences back to extracting the next correction-image 204 and processing continues until all frames are processed and the extraction is complete 209.

Figure 3:
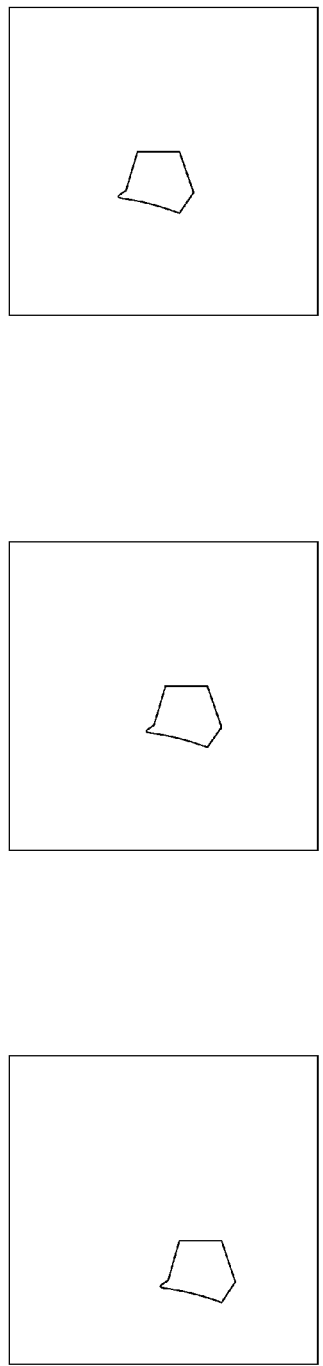
FIG. 3 is an example of the frame summation resulting from uncorrected sample drift.
Figure 3:
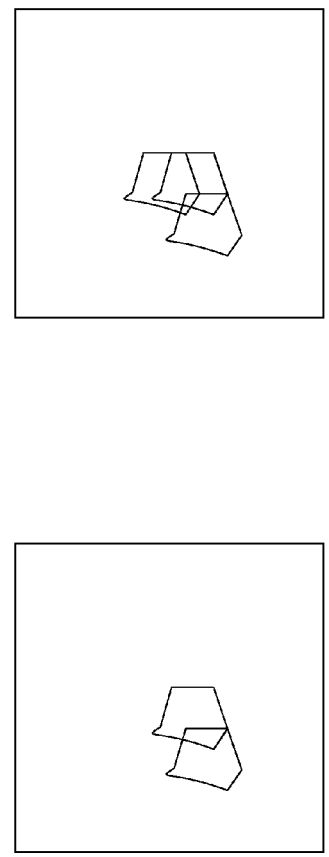
Figure 4:
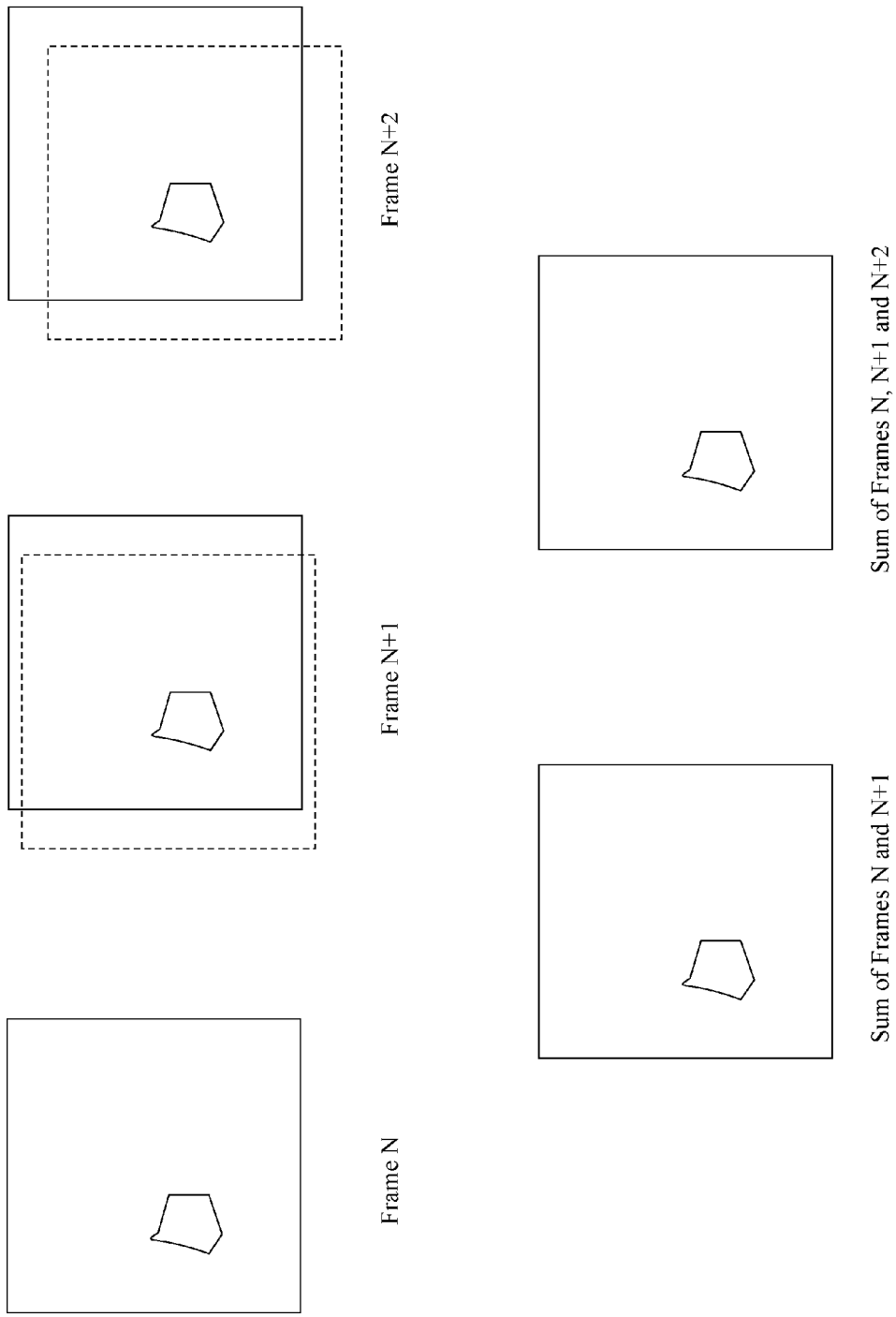
FIG. 4 is an example of the frame summation resulting from corrected sample drift.

An example of sample drift is illustrated in FIG. 3. During the acquisition of frames N, N+1 and N+2, the sample has drifted. The direct summation of frames N, N+1 and N+2 without drift correction result in unusable summation images as they are smeared. FIG. 4 illustrates the same sequence of collected frames with drift correction applied before summation. Frame N+1 is correlated against Frame N and offset vectors are applied to align Frame N+1 to Frame N. The same procedure is applied to Frame N+2. This results in the correct alignment of each frame before summation and improved image quality from the summation of frames.

While the invention has been described with reference to the correction of electron and x-ray signal collection, it will be readily apparent to those of ordinary skill that it is applicable to the fields of EELS (Electron Energy Loss Spectroscopy), EBSD (Electron Backscattered Diffraction), EBIC (Electron Beam-Induced Current Analysic), CL (Optical and Electron Cathodoluminescence), SIMMS (Secondary Ion Mass Spectrometry), Electron Spectrometry and Imaging, Ion Spectrometry and Imaging, X-ray Spectrometry and Imaging and Optical Spectrometry and Imaging.

It is also noted that although the description discusses a moving excitation source, it is also possible that the excitation source is fixed in position, and the sample moved to result in a scan of the sample. For example, in such a case the sample can be supported by a moving bed or table relative to a fixed excitation source.

The above description is included to illustrate the operation of the preferred embodiment and is not meant to limit the scope of the invention. From the above discussion, many variations will be apparent to one skilled in the relevant art that would yet be encompassed by the spirit and scope of the invention.

What is claimed is:

1. A method of correcting for drift in spectrum images resulting from concurrently collected signals, comprising:
   collecting concurrent signals resulting from a scan with an excitation source which are registered to x, y pixel positions on a sample for creating a spectrum image;
   extracting a reference image from a plurality of frames of collected signals;
   inserting pixel events corresponding to said frame of said reference image into initial pixel locations;
   indexing forward to a next frame of collected signals and extracting a first correction image using the same signal source as the reference image;
   validation checking said first correction image to determine if said first correction image is non-corrupt, and if said validation checking fails because the correction image is corrupt due to artifacts, repeating the method until a non-corrupt correction image is located; and
   once a valid correction image is located, generating correction vectors for correcting the non-corrupt correction image, and other images resulting from different signal sources, which were concurrently collected for that frame.

2. The method according to claim 1, wherein said signals result from an excitation source of at least one of an electron source, an x-ray source, an ion source, a photon source and an optical source.

3. The method according to claim 1, wherein said collecting of signals is conducted by collecting signals from the excitation source.

4. The method according to claim 1, wherein said collecting of signals is conducted by collecting signals from the sample.

5. The methods according to claim 1, further comprising concurrently collecting all signals for each frame prior to processing.

6. The method according to claim 1, wherein said validation is conducted by qualifying the spatial integrity of the image.

7. The method according to claim 1, wherein if validation fails, skipping the frame of the first correction image to the next frame until a non-corrupt image is located.

8. The method according to claim 6, wherein if validation fails, skipping the frame of the first correction image to the next frame until a non-corrupt image is located.

9. The method according to claim 1, wherein once a valid correction image is located, realigning the correction image to the reference image.

10. The method according to claim 6, wherein once a valid correction image is located, realigning the correction image to the reference image.

11. A system for acquiring spectrum images resulting from concurrently collected signals, and for correcting for drift in the spectrum images resulting from the concurrently collected signals, the system including a scan generator for generating a scan of a sample, detectors for collecting signals registered to x, y pixel positions of the beam on the sample, the system further comprising processors, related components and memory, and said processor, related components and memory being programmed for:
   generating a scan with said scan generator which is an excitation source for scanning and exciting a sample;
   collecting concurrent signals with said detectors, resulting from a scan with a scan generator for creating a spectrum image;
   extracting a reference image from a plurality of frames of collected signals;
   inserting pixel events corresponding to said frame of said reference image into initial pixel locations;
   indexing forward to a next frame of collected signals and extracting a first correction image using the same signal source as the reference image;
   validation checking said first correction image to determine if said first correction image is non-corrupt and if said validation checking fails because the correction image is corrupt due to artifacts, repeating the validation checking until a non-corrupt correction image is located; and
   once a valid correction image is located, generating correction vectors for correcting the non-corrupt correction image, and other images resulting from different signal sources, which were concurrently collected for that frame.

12. The system according to claim 11, wherein said scan generator is of the type which is at least one of an electron source, an x-ray source, an ion source, a photon source and an optical source.

13. The system according to claim 11, further configured for collecting the signals from the excitation source.

14. The system according to claim 11, further configured for collecting the signals from the sample.

15. The system according to claim 11, wherein the system is further programmed for concurrently collecting all signals for each frame prior to processing.

16. The system according to claim 11, further configured for conducting said validation by qualifying the spatial integrity of the image.

17. The system according to claim 11, further configured for skipping the frame of the first correction image if validation fails, to the next frame until a non-corrupt image is located.

18. The system according to claim 16, further configured for skipping the frame of the first correction image if validation fails, to the next frame until a non-corrupt image is located.

19. The system according to claim 11, further configured for, once a valid correction image is located, realigning the correction image to the reference image.

20. The system according to claim 16, further configured for, once a valid correction image is located, realigning the correction image to the reference image.

* * * * *